(12) United States Patent
Branyon

(10) Patent No.: US 10,377,546 B2
(45) Date of Patent: *Aug. 13, 2019

(54) FLEXIBLE PACKAGE WITH RECLOSE REGION

(71) Applicant: Sonoco Development, Inc., Hartsville, SC (US)

(72) Inventor: Jacob Donald Prue Branyon, Hartsville, SC (US)

(73) Assignee: SONOCO DEVELOPMENT, INC., Harstville, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/797,686

(22) Filed: Oct. 30, 2017

(65) Prior Publication Data

US 2018/0065786 A1 Mar. 8, 2018

Related U.S. Application Data

(63) Continuation of application No. 14/570,418, filed on Dec. 15, 2014, now Pat. No. 9,834,353.

(51) Int. Cl.
*B65D 65/14* (2006.01)
*B65D 35/10* (2006.01)
*B65D 35/18* (2006.01)
*B65D 37/00* (2006.01)
*B65D 53/08* (2006.01)
(Continued)

(52) U.S. Cl.
CPC .............. *B65D 65/14* (2013.01); *B31B 50/62* (2017.08); *B31B 50/74* (2017.08); *B32B 9/00* (2013.01); *B65B 5/022* (2013.01); *B65D 35/10* (2013.01); *B65D 35/18* (2013.01); *B65D 37/00* (2013.01); *B65D 53/08* (2013.01); *B65D 75/12* (2013.01);
(Continued)

(58) Field of Classification Search
None
See application file for complete search history.

(56) References Cited

U.S. PATENT DOCUMENTS

| 3,117,606 A | 1/1964 | Hastings | |
| 3,369,709 A * | 2/1968 | Clauss | A01C 15/02 222/107 |

(Continued)

FOREIGN PATENT DOCUMENTS

| CH | 638 446 A5 | 9/1983 | |
| EP | 2147868 A1 * | 1/2010 | ......... B65D 75/5838 |

*Primary Examiner* — Viren A Thakur
(74) *Attorney, Agent, or Firm* — Nelson Mullins Riley & Scarborough LLP

(57) ABSTRACT

A reclosable flexible package is described that includes an inner film layer, an outer film layer laminated to the inner film layer, and reclose region defined in a portion of package film layers. The reclose region includes pressure sensitive adhesive disposed between the inner and outer film layers. A number of cut lines are provided in the outer film layer in the reclose region, such that the user, by manipulating the package film layers at the reclose region, can reveal the underlying layer of pressure sensitive adhesive. Once the pressure sensitive adhesive of the reclose region is exposed, the action of the user can serve to adhere the pressure sensitive adhesive to itself and/or other portions of the film, such that the package is cinched in the area of the reclose region and maintains the remnants of the package contents within the reclosed package for later use.

23 Claims, 2 Drawing Sheets

(51) Int. Cl.
  *B65B 5/02* (2006.01)
  *B65D 75/12* (2006.01)
  *B65D 85/60* (2006.01)
  *B31B 50/62* (2017.01)
  *B31B 50/74* (2017.01)
  *B32B 9/00* (2006.01)

(52) U.S. Cl.
  CPC ........ *B65D 85/60* (2013.01); *B65D 2575/586* (2013.01)

(56) References Cited

U.S. PATENT DOCUMENTS

| | | |
|---|---|---|
| 3,402,052 A | 9/1968 | Walker |
| 3,679,126 A | 7/1972 | Lake |
| 4,904,092 A | 2/1990 | Campbell et al. |
| 4,913,560 A | 4/1990 | Herrington |
| 4,973,171 A | 11/1990 | Bullard |
| 5,044,776 A | 9/1991 | Schramer |
| 6,139,185 A | 10/2000 | Hamilton et al. |
| 6,238,762 B1 | 5/2001 | Friedland et al. |
| 6,495,228 B1 | 12/2002 | Mauch et al. |
| 7,262,393 B2 | 8/2007 | Ishii et al. |
| 2003/0057206 A1 | 3/2003 | Ishii et al. |
| 2004/0031201 A1 | 2/2004 | Weder |
| 2005/0079322 A1 | 4/2005 | Knoerzer et al. |
| 2005/0152623 A1 | 7/2005 | Marley et al. |
| 2010/0074561 A1 | 3/2010 | Feig |
| 2010/0113241 A1 | 5/2010 | Hebert et al. |
| 2011/0038569 A1 | 2/2011 | Huffer et al. |
| 2011/0210161 A1* | 9/2011 | Madai ............ B32B 27/00 229/87.05 |
| 2013/0056469 A1 | 3/2013 | Davis et al. |
| 2013/0121623 A1 | 5/2013 | Lyzenga et al. |
| 2013/0224346 A1* | 8/2013 | Cheema .......... B65D 65/22 426/122 |
| 2013/0259406 A1 | 10/2013 | Fisher et al. |

* cited by examiner

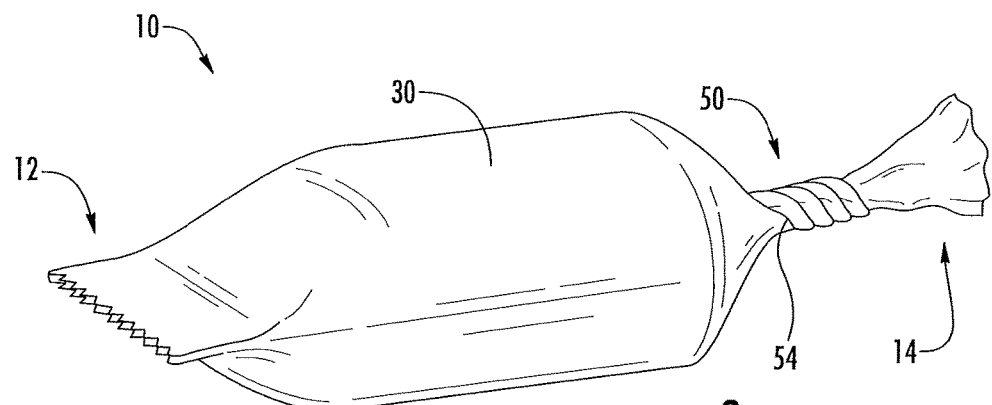
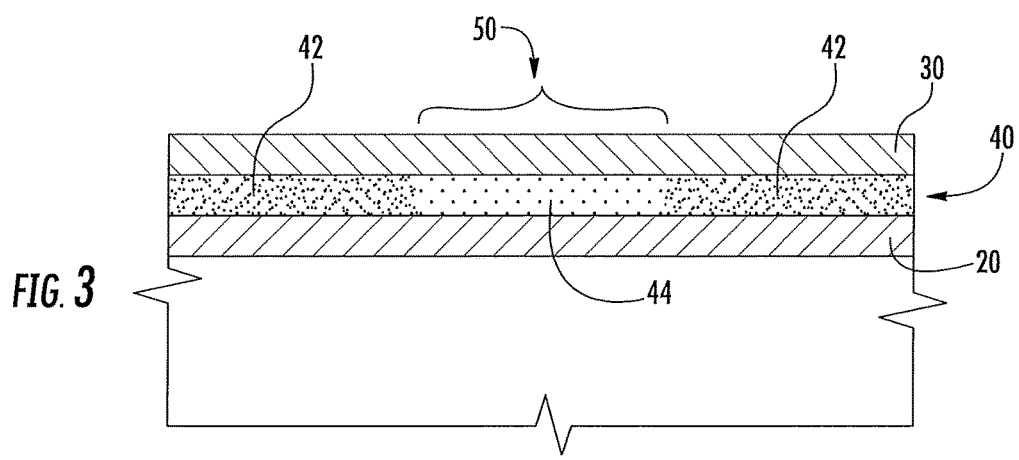
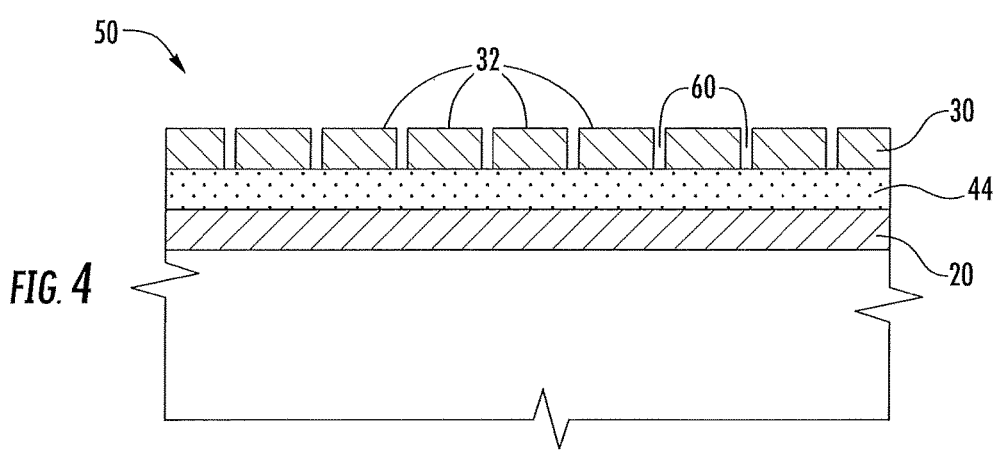

FLEXIBLE PACKAGE WITH RECLOSE REGION

CROSS-REFERENCE TO RELATED APPLICATIONS

This application is a continuation of U.S. patent application Ser. No. 14/570,418, filed Dec. 15, 2014, which is incorporated by reference herein in its entirety.

TECHNICAL FIELD

The present disclosure relates in general to packaging for products, and more particularly to packaging constructed from flexible film-based materials. The disclosure is especially concerned with packages that can be resealed to hold smaller portions of the contents that are not used so that they may be used at a later time.

BACKGROUND

Flexible films and laminates can be used to make various types of packages. A bar wrap or slug-type flexible package, for example, can be made when vertically stacked products are wrapped by the film to form a sleeve of products. Such packages can be used, for example, to hold cookies, crackers, and candy bars, where a column configuration is formed by the film around the contents and the film is sealed at its ends and along a longitudinal seam extending between the two ends.

BRIEF SUMMARY

In conventional bar wrap and slug-type packages, it is often difficult or impossible to reseal the package once the end or seam of the package has been opened. As such, any contents that are unconsumed cannot be easily maintained for future consumption.

Embodiments of the invention described herein provide improved packages and methods for manufacturing the packages that are easy for a consumer to reclose relative to conventional packages and can be resealed in a manner to facilitate storage of the product within the package for future use. In particular, embodiments of a package for holding a product are described that include an inner film layer, an outer film layer laminated to the inner film layer, and a reclose region defined in a portion of the inner and outer film layers. The reclose region may comprise pressure sensitive adhesive disposed between the inner and outer film layers and a plurality of cut lines defined in the outer film layer in the reclose region. The cut lines may be configured to expose at least one area of the pressure sensitive adhesive in the reclose region when a reclose force is applied to the package, such that the at least one area of exposed pressure sensitive adhesive is adhereable to other parts of the flexible package to reclose the flexible package, thereby securing at least a portion of the product therein after the package has been opened. The product held within the flexible package may, for example, comprise a candy bar.

In some cases, the reclose region may comprise sections devoid of adhesive. The flexible package may define a first end and a second end, and the reclose region may be located approximately equidistantly from the first and second ends. Additionally or alternatively, the package may be configured such that the outer film layer delaminates from the inner film layer in the reclose region upon application of the reclose force, thereby exposing the at least one area of pressure sensitive adhesive.

The cut lines may, in some cases, be straight lines. In other cases, the cut lines may be at a non-zero angle with respect to a longitudinal axis of the flexible package. Furthermore, the cut lines may be spaced approximately ⅛-inch to approximately ¼-inch apart in the reclose region.

In other embodiments, a method for manufacturing a flexible package for holding a product is provided, where the method includes laminating an outer film layer to an inner film layer and defining a reclose region in a portion of the inner and outer film layers. The reclose region may be defined by applying a pressure sensitive adhesive between the inner film layer and the outer film layer in at least part of the reclose region and may define cut lines in the outer film layer in the reclose region, such that, upon application of a reclose force to the package by a user, at least one area of pressure sensitive adhesive is exposed and is adhereable to other portions of the flexible package to reclose the flexible package, thereby maintaining at least a portion of the product therein after the package has been opened.

In some cases, applying the pressure sensitive adhesive may comprise flood coating the inner film layer with the pressure sensitive adhesive, whereas in other cases applying the pressure sensitive adhesive may comprise pattern applying the pressure sensitive adhesive to the inner film layer. Additionally or alternatively, defining cut lines in the outer film layer in the reclose region may comprise defining the cut lines such that the reclose force comprises a twisting action.

In some embodiments, the method may further include disposing a product in the flexible package, such as a candy bar. The method may also include sealing first and second ends of the inner and outer film layers, after the outer film layer is laminated to the inner film layer, to form the flexible package and secure the product therein. Moreover, cut lines may be defined in the outer film layer in the reclose region by laser scoring the cut lines in the outer film layer.

Defining cut lines in the outer film layer in the reclose region may, in some cases, comprise defining straight cut lines in the outer film layer, whereas in other cases, defining cut lines in the outer film layer in the reclose region may comprise defining the cut lines at a non-zero angle with respect to a longitudinal axis of the flexible package. Furthermore, defining cut lines in the outer film layer in the reclose region may comprise spacing the cut lines to be approximately ⅛-inch to approximately ¼-inch apart in the reclose region.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 2 is a perspective view of the flexible package of FIG. 1B in a reclosed configuration according to an example embodiment;

FIG. 3 is a partial cross-sectional view of the flexible package of FIG. 1A along line 3-3 according to an example embodiment; and FIG. 4 is a partial cross-sectional view of the flexible package of FIG. 1A along line 4-4 according to an example embodiment.

DETAILED DESCRIPTION OF THE DRAWINGS

Figure 1A:
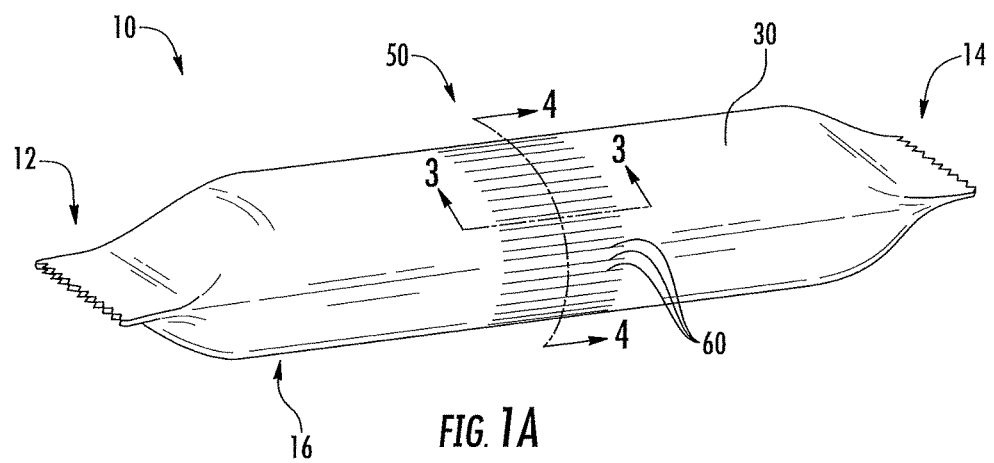
FIG. 1A is a perspective view of a flexible package with a reclose region according to an example embodiment.

The present invention now will be described more fully hereinafter with reference to the accompanying drawings in which some but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As noted above, flexible packages, such as bar wrap and slug wrap packages, are used for packaging various types of contents, including food goods and other consumables. Bar wrap and slug wrap packages, for example, have been conventionally used to package cookies, crackers, candy bars, and other food items. Depending on the size and/or quantity of the food item and the appetite of the consumer, less than the entire food item may be eaten by the consumer in one sitting. In the case of a full size candy bar, for example, a consumer may only eat half of the candy bar at a given time and may wish to save the other half to eat at a later time.

Bar wraps and slug wraps, which may be sealed at two opposite ends and may have a longitudinal seam extending between the two ends, may typically be opened by a consumer to provide access to the contents by the consumer ripping open one end of the package and/or at least partially undoing the seal of the package along the longitudinal seam, such as by pulling apart the package starting from the ripped end and moving towards the middle of package. As such, there is no convenient way to allow the user to reseal the package because one end has been destructively opened and/or at least part of the seam has been pulled apart. Thus, any portion of the food contents (e.g., the remaining half of the candy bar in the example above) may either be thrown out by the user to avoid the hassle of re-packaging the contents, or additional means (e.g., a piece of tape) may be used to hold the opened package together around the remaining portion of candy bar. Under the first scenario, the consumer must unnecessarily waste some of the product, and under the second scenario the consumer must expend additional time, effort, and resources in an attempt to reseal the package, which attempt may fail and cause the product to, nonetheless, be wasted.

Through ingenuity and hard work, the inventor has developed a reclosable flexible package that includes a reclose region defined in a portion of package film layers. As described in greater detail below, the reclose region is configured such that the user, by twisting or otherwise manipulating the film layers near an empty portion of the package, can reveal an underlying layer of pressure sensitive adhesive (PSA). Once the PSA of the reclose region is exposed, the action of the user can serve to adhere the PSA to itself and/or other portions of the film, such that the package is cinched in the area of the reclose region and maintains the remnants of the package contents within the reclosed package for later consumption.

Figure 1B:
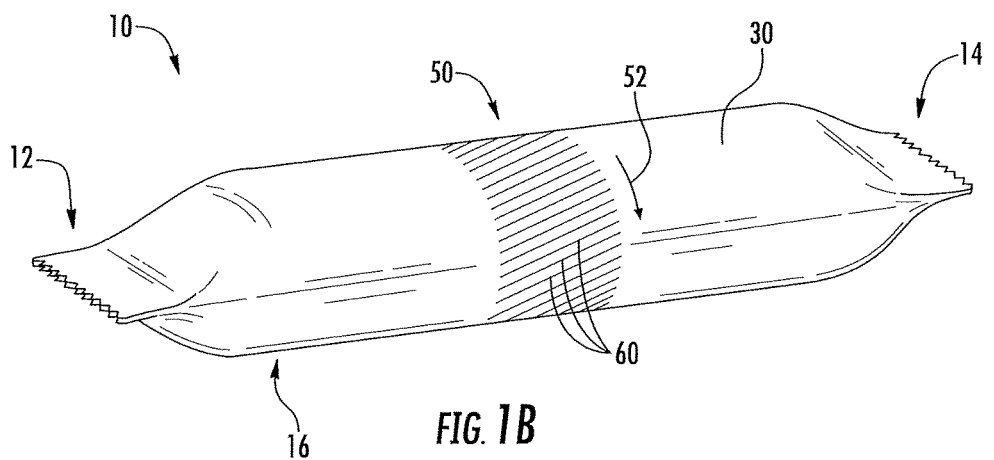
FIG. 1B is a perspective view of a flexible package with a reclose region according to another example embodiment.

Turning now to FIGS. 1A and 1B, a flexible package 10 according to embodiments of the invention is shown. The flexible package 10 may be configured to hold a product, and in some cases the product may be a food item. For example, the flexible package 10 may be designed to hold a candy bar in some cases, although embodiments of the flexible package may be configured for holding various other types of food and non-food products, including cookies, crackers, mints, gum, etc. In some embodiments, the flexible package 10 includes a first end 12 and a second end 14 and a longitudinal seam 16 extending between the first and second ends. For example, the flexible package 10 may be made by sealing (e.g., via heat sealing) a rectangular sheet of laminate along corresponding edges of the sheet to form the longitudinal seam 16 and sealing (e.g., via heat sealing) the resulting first and second ends 12, 14 of the package 10 to contain the product within the package. For example, the package 10 may be closed using a "fin seal" or a "lap seal." Accordingly, in some embodiments, the flexible package 10 may be a bar wrap or slug wrap-type of package.

Embodiments of the flexible package 10 may thus include an inner film layer 20 and an outer film layer 30 that is laminated to the inner film layer, as shown in FIG. 3, which together may form the sheet of laminate that is sealed as described above to make the flexible package 10 of FIGS. 1A and 1B. In some cases, the inner film layer 20 may comprise polyethylene, biaxially oriented polypropylene, and/or metalized biaxially oriented polypropylene, and the outer film layer 30 may comprise Biaxially oriented polypropylene or polyester, to name a few example. The inner and outer film layers 20, 30 may be laminated to each other via an adhesive layer 40, which may include portions of permanent adhesive 42.

As shown in FIGS. 1A and 1B, the flexible package 10 may further include a reclose region 50 that is defined in at least a portion of the inner and outer film layers 20, 30. The reclose region 50 may comprise pressure sensitive adhesive (PSA) 44 that is disposed between the inner and outer film layers 20, 30. Thus, as shown in FIG. 3, in some embodiments, the adhesive layer 40 includes a PSA portion 44 in addition to the permanent adhesive portions 42, and the location of the PSA portion 44 may correspond to the location of the reclose region 50. Accordingly, in some embodiments; the adhesive layer 40 may be made by pattern printing permanent adhesive 42 and PSA 44.

In addition, a plurality of cut lines 60 may be defined in the outer film layer 30 in the reclose region 50. The cut lines 60 may be configured to expose at least one area of the PSA portion 44 of the adhesive layer 40 in the reclose region 50 when a reclose force is applied to the package 10, such that the at least one area of exposed PSA can be adhered to other parts of the flexible package to reclose the flexible package. In this way, at least a portion of the product (e.g., an uneaten half of a candy bar) can be secured within the package 10 after the package has been opened, allowing the user to consume the remaining portion of the product at a later time by keeping the portion of the product cleaner and fresher than it would have been otherwise if left in a package having an unsealed opened end.

For example, with reference to FIGS. 1B and 2, a user may open the package 10 by ripping, cutting, or otherwise opening the second end 14 of the package 10 of FIG. 1B to gain access to the product held inside the package (e.g., a candy bar). Once the package is opened, the user may push the candy bar (in this example) towards the open end (the second end 14 in this example) by manipulating the candy bar through the packaging near the first end 12 (e.g., by applying a pinching action with his or her fingers at the first end 12 and moving the pinched fingers in the direction of the opened second end 14). As a result, a corresponding end of the candy bar may be pushed out of the opened second end 14 in this example, and the user may proceed to eat a desired piece of the candy bar.

If the entire candy bar is not consumed, the user may withdraw the remaining portion of the candy bar back into the package 10, such as by allowing the candy bar to slip back into the package to rest against the closed first end 12 (in this example), which results in part of the package 10 having the candy bar therein and another part being empty. The user may then apply a reclose force to the empty side of the package 10, near the reclose region 50. According to some embodiments, the reclose force that serves to expose portions of the PSA 44 in the reclose region 50 may be a twisting action.

In this regard, the user may grip the full side of the package 10 (in this example, the side of the package between the first end 12 and the reclose region 50) in one hand and may grip the empty side of the package (in this example, the side of the package between the second end 14 and the reclose region 50) in the other hand. The user may then apply the reclose force (e.g., the twisting action) by rotating one side of the package 10 in one direction (e.g., as designated by the arrow 52 in FIG. 1B) while holding the other side of the package still or rotating the other side of the package in an opposite direction (e.g., opposite to the direction of the arrow 52), such as to achieve the configuration depicted in FIG. 2.

With reference to FIG. 4, which illustrates a cross-sectional view of the reclose region 50 taken along line 4-4 of FIG. 1A, according to some embodiments, the reclose force may cause the outer film layer 30 to delaminate from the inner film layer 20 in the reclose region 50, thereby exposing the at least one area of the PSA 40. Thus, for example, as the user twists the packaging as described above, the outer film layer 30 may begin to separate from the underlying PSA 44 in the reclose region 50 as the twisting action may lift away parts of the outer film layer 30 (e.g., along the cut lines 60), leaving the PSA adhered to the inner film layer 20, and create stresses in the strips 32 of the outer film layer between adjacent cut lines 60 that cause the strips to tear and move away from the underlying PSA 44. In this way, continued application of the reclose force (e.g., as the user continues to twist the packaging) may bring the exposed areas of the PSA 44 into contact with other exposed areas of PSA, and the contacting areas of PSA may thus be adhered to each other, resulting in a twist seal 54 in the reclose region 50, as shown in FIG. 2.

In addition to or instead of exposed areas of the PSA portion 44 contacting and sealing against other exposed area of PSA, in some cases the exposed areas of the PSA may come into contact with and be adhered to portions of the outer film layer 30, such as parts of the outer film layer that remain laminated to the inner film layer 20, in the reclose region 50 or outside the reclose region. In still other embodiments, the reclose region 50 may comprise sections that are devoid of PSA 44, such that the inner and outer film layers 20, 30 are not adhered to one another in those sections. Sections of the reclose region 50 that are devoid of PSA 44 or any other adhesive may be provided, for example, to facilitate exposure of the PSA portion 40 in the reclose region 50 upon the application of the reclose force. For example, the extent and location of the sections that are devoid of PSA 44 may be determined such that the reclose force necessary to cause exposure of the PSA 44 underlying the outer film layer 30 in the reclose region 50 is not excessive and, for example, can be provided through a simple twisting action or other action supplied by the user.

In this regard, although the example of a twisting action is described above with respect to the reclose force, it is understood that a number of user actions may provide the needed reclose force to expose the PSA 44, including rubbing, scratching, scraping, folding, and/or bending the material in the reclose region 50.

The reclose region 50 may be configured in various ways to allow for the PSA portions 44 underlying the outer film layer 30 to be exposed when the reclose force is applied. For example, as shown in FIGS. 1A and 1B, in some embodiments the reclose region 50 may be located approximately equidistantly from the first and second ends 12, 14 of the package 10, such that the reclose region is provided in a central area of the package. In other embodiments, however, the reclose region 50 may be located closer to one end or the other. In still other embodiments, multiple reclose regions 50 may be provided, such that the user can reclose the package 10 at different locations depending on how much of the product is consumed (e.g., a quarter of the product is consumed, versus half of the product is consumed, versus three-quarters of the product is consumed, etc.). In some cases, the reclose region 50 may extend a length of about ½-inch to 1½ inches in a direction along the longitudinal axis of the package (e.g., in a package configured for holding a typical full-size candy bar), whereas in other cases (e.g., with respect to larger packages, such as crackers) the length of the reclose region 50 may be greater than 1-inch, such as 2-inches or more. Moreover, the reclose region 50 may comprise a continuous band of cut lines 60 that wraps around the full circumference or perimeter (with respect to a cross-section taken perpendicularly to the longitudinal axis) of the package 10, while in other cases the reclose region 50 may extend only part of the way around the package, such as about halfway around or ¾ of the way around.

In addition to the location of the reclose region 50, the configuration of the cut lines 60 (e.g., shape, spacing, depth, etc.) of the reclose region 50 may also vary depending on the types of materials used for the inner and outer film layers, the overall shape of the package, the target amount of reclose force, aesthetic considerations, manufacturing considerations, and/or other technical or marketing parameters that may be involved. For example, in some embodiments, the cut lines 60 may be provided as straight lines, as shown in FIGS. 1A and 1B, whereas in other embodiments the cut lines may be curved or wavy. Similarly, in some embodiments the cut lines 60 may extend parallel to a longitudinal axis of the package 10 (e.g., an axis that extends longitudinally between the first and second ends 12, 14), as shown in FIG. 1A, whereas in other embodiments, the cut lines 60 may be provided at a non-zero angle with respect to the longitudinal axis of the flexible package 10 (e.g., not parallel to the longitudinal axis of the package), as shown in FIG. 1B. Moreover, in some embodiments, such as in embodiments designed for packaging candy bars, the cut lines 60 may be spaced approximately ⅛-inch to approximately ¼-inch apart in the reclose region 50, although for other applications the package 10 may be configured so as to have cut lines that may be spaced less than ⅛-inch apart or more than ¼-inch apart. In still other embodiments, the cut lines 60 may be configured to have a depth that is less than the thickness of the outer film layer 30 (e.g., where the cut does not reach the PSA 44 of the adhesive layer 40), whereas in some embodiments the cut lines 60 extend through the entire thickness of the outer film layer 30 and, in some cases, at least partially penetrate the PSA 44 of the adhesive layer 40.

Embodiments of a method of manufacturing a flexible package for holding a product are also described herein. According to embodiments of the method, an outer film layer may be laminated to an inner film layer as described above, and a reclose region may be defined in a portion of the inner and outer film layers. The reclose region may be defined by applying PSA between the inner film layer and the outer film layer in at least part of the reclose region and defining cut lines in the outer film layer in the reclose region. The cut lines may be defined such that upon application of a reclose force to the package by a user, at least one area of PSA is exposed and is adhereable to other portions of the flexible package to reclose the flexible package, thereby maintaining at least a portion of the product therein after the package has been opened, as described above.

In some cases, the PSA may be applied by flood coating the inner film layer with the PSA. In other cases, applying the PSA may comprise pattern applying the PSA to the inner film layer, such as by pattern applying the PSA with permanent adhesive and/or areas devoid of adhesive, as described above. Moreover, the cut lines in the reclose region may be defined in the outer film layer by defining the cut lines such that the reclose force comprises a twisting action.

In some embodiments, a product, such as a candy bar, may be disposed in the flexible package. First and second ends of the inner and outer film layers may, after the outer film layer is laminated to the inner film layer, be sealed at the inner and outer ends to package secure the product therein, as described above.

The cut lines may be defined in the outer film layer in the reclose region, in some embodiments, by laser scoring the cut lines in the outer film layer or by mechanically forming the cut lines (e.g., using a blade). Moreover, the cut lines may, in some cases, be lines of weakness, such as cuts that do not go completely through a particular material or layer of material, or a series of discontinuous perforations.

Additionally or alternatively, the cut lines may be defined via straight cut lines in the outer film layer, and/or the cut lines may be defined at a non-zero angle with respect to a longitudinal axis of the flexible package, as described above. The cut lines in the outer film layer in the reclose region may comprise spacing of approximately ⅛-inch to approximately ¼-inch between adjacent cut lines.

The embodiments described have been simplified for ease of explanation. For example, with reference to FIG. 3, a laminate is depicted having two layers—an outer film layer 30 and an inner film layer 20—with an adhesive layer 40 disposed therebetween. In some embodiments, however, additional layers may be included, such as additional film layers, barrier layers, ink layers, etc. Moreover, packages implementing embodiments of the invention described herein may include various other features, such as easy-open features, pull tabs, tamper evident features, etc.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A reclosable flexible package for holding a product, the flexible package comprising:
    an inner film layer;
    an outer film layer laminated to the inner film layer to form a laminate, wherein the laminate forms the flexible package having a length and first and second opposing ends and the flexible packaging comprises an interior cavity into which a product can be placed, and wherein the inner film layer faces the cavity; and
    a reclose region defined in a portion of the laminate, the reclose region comprising pressure sensitive adhesive disposed between the inner and outer film layers and a plurality of cut fines defined in the outer film layer within the reclose region,
    wherein a plurality of strips of the outer film layer are disposed between adjacent cut lines of the plurality of cut lines, each of the plurality of strips extends in a longitudinal direction toward the first and second opposing ends of the flexible package, and each of the plurality of strips having opposing longitudinal ends extending to the respective adjacent cut lines that define each strip, and the entirety of the opposing longitudinal ends of each strip are uncut and continuous with the outer film layer, and the plurality of cut lines extend around a full circumference or perimeter of the flexible package; and
    wherein when the package is in a reclosed configuration, the opposing longitudinal ends of each strip remain uncut and continuous with the outer film layer and for a plurality of the strips, a portion of each strip between its opposing longitudinal ends is separated from the pressure sensitive adhesive and at least a first region of pressure sensitive adhesive is adhered to at least a second region of pressure sensitive adhesive.

2. The flexible package of claim 1, wherein when the package is in a reclosed configuration, separation of each of the plurality strips from the pressure sensitive adhesive forms a plurality of exposed regions of pressure sensitive adhesive and at least a portion of a first exposed region of pressure sensitive adhesive is adhered to at least a portion of a second exposed region of pressure sensitive adhesive.

3. The flexible package of claim 1, wherein the plurality of cut lines are parallel to one another.

4. The flexible package of claim 1, wherein the reclose region comprises sections devoid of adhesive.

5. The flexible package of claim 1, wherein the reclose region is located between the first and second opposing ends.

6. The flexible package of claim 5, wherein the flexible package comprises a sleeve, a bar wrap, or a slug-type package.

7. The flexible package of claim 5, wherein the flexible package comprises a plurality of reclose regions located between the first and second opposing ends.

8. The flexible package of claim 1, wherein the plurality of cut lines are straight lines.

9. The flexible package of claim 1, wherein the plurality of cut lines are parallel with a longitudinal axis of the package.

10. The flexible package of claim 1, wherein the plurality of cut lines are at a non-zero angle with respect to a longitudinal axis of the flexible package.

11. The flexible package of claim 1, wherein the plurality of cut lines are spaced approximately ⅛-inch to approximately ¼-inch apart in the reclose region.

12. A reclosable flexible package for holding a product, the flexible package comprising:
an inner film layer;
an outer film layer laminated to the inner film layer to form a laminate, wherein the laminate forms the flexible package having a length and first and second opposing ends, and the flexible package comprises an interior cavity into which a product can be placed, and wherein the inner film layer faces the cavity; and
a reclose region defined in a portion of the laminate, the reclose region comprising pressure sensitive adhesive disposed between the inner and outer film layers and a plurality of cut lines defined in the outer film layer in the reclose region,
wherein a plurality of strips of the outer film layer are disposed between adjacent cut lines of the plurality of cut lines, each of the plurality of strips extends in a longitudinal direction toward the first and second opposing ends of the flexible package and each of the plurality of strips having opposing longitudinal ends extending to the respective adjacent cut lines that define each strip, and the entirety of the opposing longitudinal ends of each strip are uncut and continuous with the outer film layer, and the plurality of cut lines extend around a full circumference or perimeter of the flexible package; and
wherein when the package is in a reclosed configuration, the opposing longitudinal ends of each strip remain uncut and continuous with the outer film layer;
for a plurality of the strips, a portion of each strip between its opposing longitudinal ends is separated from the pressure sensitive adhesive, forming an exposed region of pressure sensitive adhesive; and
at least a portion of the exposed region of pressure sensitive adhesive is adhered to a portion of the outer film layer.

13. The flexible package of claim 12, wherein the cut lines are wavy lines.

14. The flexible package of claim 12, wherein the cut lines are curved lines.

15. The flexible package of claim 12, wherein the reclose region comprises sections devoid of adhesive.

16. The flexible package of claim 12, wherein the reclose region is located between the first and second opposing ends.

17. The flexible package of claim 16, wherein the flexible package comprises a sleeve, a bar wrap, or a slug-type package.

18. A reclosable flexible package for holding a product, the flexible package comprising:
an inner film layer;
an outer film layer laminated to the inner film layer to form a laminate, wherein the laminate forms the flexible package having a length and first and second opposing ends and the flexible packaging comprises an interior cavity into which a product can be placed, and wherein the inner film layer faces the cavity; and
a reclose region defined in a portion of the laminate, the reclose region comprising pressure sensitive adhesive disposed between the inner and outer film layers and a plurality of cut lines defined in the outer film layer in the reclose region,
wherein a plurality of strips of the outer film layer are disposed between adjacent cut lines of the plurality of cut lines, each of the plurality of strips extends in a longitudinal direction toward the first and second opposing ends of the flexible package and each of the plurality of strips having longitudinal ends extending to the respective adjacent cut lines that define each strip, and the entirety of the opposing longitudinal ends of each strip remain uncut and continuous with the outer film layer, and the plurality of cut lines extend around a full circumference or perimeter of the flexible package;
wherein when the package is in a sealed or open, but not reclosed configuration, each strip has a longitudinal direction and both longitudinal ends of each strip remain uncut and continuous with the outer film layer; and
wherein when the package is in a reclosed configuration, the opposing longitudinal ends of each strip remain uncut and continuous with the outer film layer and for a plurality of the strips, a portion of each strip between its opposing longitudinal ends is separated from the pressure sensitive adhesive and at least a first region of pressure sensitive adhesive is adhered to at least a second region of pressure sensitive adhesive or a portion of the outer film layer.

19. A method of manufacturing a flexible package for holding a product, the method comprising:
laminating an outer film layer to an inner film layer to form a laminate; and
defining a reclose region in a portion of the laminate, wherein the reclose region is formed by:
applying a pressure sensitive adhesive between the inner film layer and the outer film layer in the reclose region, and
cutting a plurality of lines into the outer film layer of the reclose region, said plurality of cut lines defining a plurality of strips of the outer film layer disposed between adjacent cut lines of the plurality of cut lines, wherein each of the plurality of strips extends in a longitudinal direction toward first and second opposing ends of the flexible package and each of the plurality of strips having opposing longitudinal ends extending to the respective adjacent cut lines that define each strip, and the entirety of the opposing longitudinal ends of each strip remain uncut and continuous with the outer film layer and the plurality of cut lines extend around a full circumference or perimeter of the flexible package;
sealing at least one end of the flexible package to create an interior cavity, wherein the inner film layer faces the interior cavity, and
wherein when the package is in a reclosed configuration, the opposing longitudinal ends of each strip remain uncut and continuous with the outer film layer and for a plurality of the strips, a portion of each strip between its opposing longitudinal ends is separated from the pressure sensitive adhesive and at least a first region of pressure sensitive adhesive is adhered to at least a second region of pressure sensitive adhesive.

20. The method of claim 19, wherein applying the pressure sensitive adhesive comprises flood coating the inner film layer with the pressure sensitive adhesive.

21. The method of claim 19, wherein applying the pressure sensitive adhesive comprises pattern applying the pressure sensitive adhesive to the inner film layer.

22. The method of claim 19 further comprising disposing a product in the flexible package between a first and second end of the laminate and sealing the first and second ends of the laminate.

23. The method of claim 19, wherein cutting the lines in the outer film layer comprises laser scoring the cut lines.

* * * * *